United States Patent [19]

Russ

[11] 4,450,637
[45] May 29, 1984

[54] EASY-FRAME

[76] Inventor: Norman Russ, P.O. Box 508, Norwich, Conn. 06360

[21] Appl. No.: 437,352

[22] Filed: Jan. 28, 1983

[51] Int. Cl.³ .......................... A47G 1/06; G09F 1/12
[52] U.S. Cl. ........................................ 40/152; 40/155; 40/156; 403/401
[58] Field of Search ...................... 40/152, 156, 152.1, 40/155, 157, 153, 154; 403/401, 402

[56]  References Cited

U.S. PATENT DOCUMENTS

| | | | |
|---|---|---|---|
| 2,884,727 | 5/1959 | Camus | 40/156 |
| 3,205,601 | 8/1965 | Gawne et al. | 40/156 |
| 3,284,113 | 11/1966 | Howell | 40/152 |
| 3,386,198 | 6/1968 | Howell | 40/156 |
| 4,023,293 | 5/1977 | Murray | 40/152 |
| 4,261,122 | 4/1981 | LeVine | 40/152 |
| 4,261,124 | 4/1981 | Carter | 40/156 |

Primary Examiner—Gene Mancene
Assistant Examiner—James Hakomaki
Attorney, Agent, or Firm—McCormick, Paulding & Huber

[57]  ABSTRACT

This invention consists of four separate frame pieces or moldings held together with appropriate pivot pins and springs. By simply rotating any two opposing frame pieces, the remaining frame pieces at ninety degrees are simultaneously rotated in the same direction and held open ready for mounting in logical order the various items which constitute a completely framed photo, diploma, painting, etc. After assembling the required items, the frame pieces are again grasped and rotated in the opposite direction, forcing complete closure of the four frame pieces around the items mounted.

1 Claim, 5 Drawing Figures

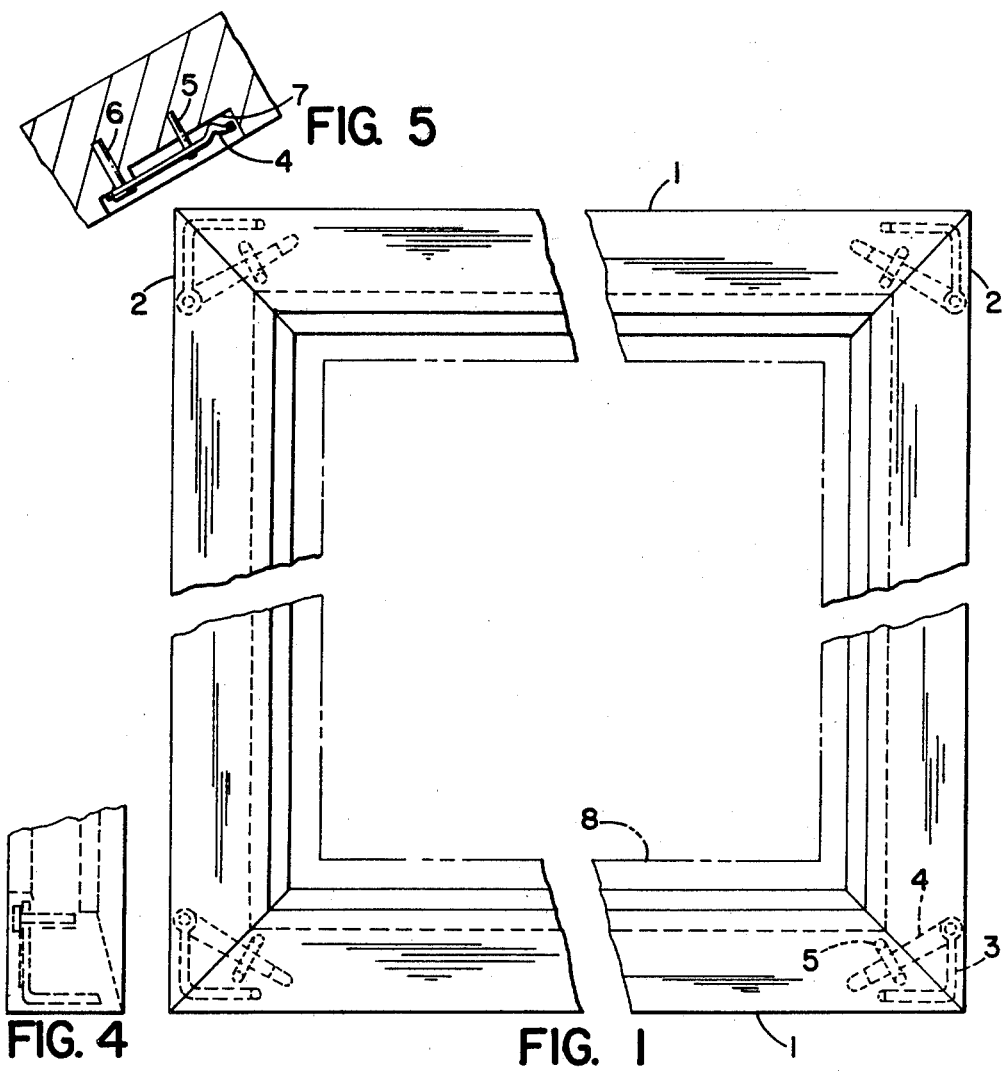
FIG. 5
FIG. 4
FIG. 1
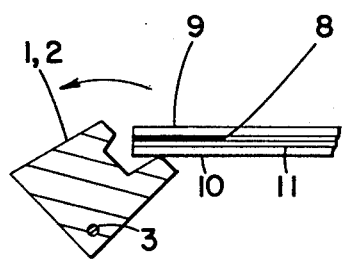
FIG. 2
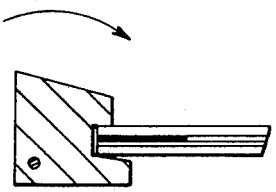
FIG. 3

EASY-FRAME

This invention relates generally to rectangular frames of the type used for photographs, diplomas, and painting or the like. More particularly, this invention relates to a frame comprising four frame pieces or moldings held together at the corner with L-shaped pivot pins and springs so that one can simply rotate any two opposing frame pieces outwardly and the other two frame pieces will simultaneously rotate in the same direction and be held in place while one mounts the photograph, diploma and painting or the like.

BRIEF DESCRIPTION OF THE DRAWINGS

FIG. 1 is a front view of the preassembled frame showing the details which hold together the frame in both the open and closed positions.

FIG. 2 is a partial section illustrating the method of opening the frame and the placing of the photo in its related components on the lower edge of the opened frame molding.

FIG. 3 is a partial section showing the photograph and related parts assembled and the frame pieces rotated to their closed positions.

FIG. 4 is a partial side view showing the pivot pin and the manner of anchoring the pin in place.

FIG. 5 is an angular partial view clarifying the assembly of the flat spring and its retaining staple, the anchor pin for the L-shape pivot pin and the recess in the frame which houses the various parts.

DETAILED DESCRIPTION

Turning now to the drawing in greater detail, FIG. 1 shows a rectangular frame having top and bottom pieces 1, 1 and side pieces 2, 2 joined by a unique pivot construction to be described.

Each pivot construction includes an L-shaped pivot pin 3 with legs extending at 90 degrees to one another one of which legs is fixed in the end portion of an associated frame piece 2, 2 such that the right angle end portion thereof is adapted to pivotally receive the top and bottom frame pieces 1, 1. Thus, each vertical leg in the picture frame shown in FIG. 1 is driven into its associated vertically extending frame piece and the inner end of such vertical leg defines a closed loop portion which receives an anchor pin 6 that assures the fact that the L-shaped pivot pin is securely anchored to the vertical frame pieces.

The anchor pin 6 in turn secures one end of a flat leaf spring 4 so that the leaf spring extends across the area of the joint between the frame pieces and into a recess provided for this purpose in the top and bottom frame pieces 1, 1. A staple element 5 is provided in the horizontally extending frame pieces 1, 1 so as to restrain the free end of leaf spring 4 in order that it not move laterally and to act as a detent and locking device in combination with the leaf spring. Leaf spring 4 may be provided with a detent adjacent its free end portion to cooperate with the staple element 5 in defining an open position for the frame (see FIG. 2).

By grasping side pieces 2, 2 and rotating them away from one another the top and bottom frame pieces 1, 1 are forced to rotate also about the axis of horizontally extending leg of each pivot pin. As a result of the action of the leaf spring 4 against the staple 5 this opening motion of the side frame pieces will achieve corresponding motion of the top and bottom frame pieces at least until the detent mentioned previously engages the underside of the staple and locks the frame in its opened configuration. In the open condition it will be apparent that a photo, backing board, mat or other insert can be placed in position as suggested in FIG. 3. FIG. 3 shows the frame pieces closed around such insert material.

FIG. 4 illustrates the degree of movement permitted by the horizontally extending leg of the pivot pin 3 with the vertical leg being anchored in place by anchor pin 6. If desired, the vertical leg of each pivot pin can be serrated so that when this leg is driven into the vertical frame pieces it is securely held in place, and so that the top and bottom frame pieces are free to pivot on the horizontally extending leg of such pivot pin.

Finally, FIG. 5 illustrates the recess 7 for housing the flat spring in such a way that the spring extends across between the area of the joint between the vertical and horizontal frame pieces, and also illustrates the V-shaped detent which cooperates with the staple 5.

I claim the following:

1. A rectangular frame comprising opposed pairs of frame pieces normally arranged in a common plane, said frame pieces having ends adapted to abut one another at the frame corners pivot pins for said frame ends, each pin having an L-shape and each leg of each L-shaped pin being located adjacent to the outer peripheral edge of its associated frame piece and also adjacent to the rear face of its associated frame piece, whereby each frame piece can be pivoted out of said plane to permit placement of flat items in the frame for display, a flat spring extending across the abutting ends of said frame pieces and secured to one of said L-shaped pin legs, said spring having a free end projecting into a cavity defined by that frame piece associated with the other L-shape pin leg, and a staple coupled to the free end of said spring and secured to said other frame piece for achieving movement of one pair of frame pieces in response to movement of the other pair.

* * * * *